April 24, 1934.   T. M. MUELLER   1,956,078
TRANSMISSION
Filed Oct. 4, 1933
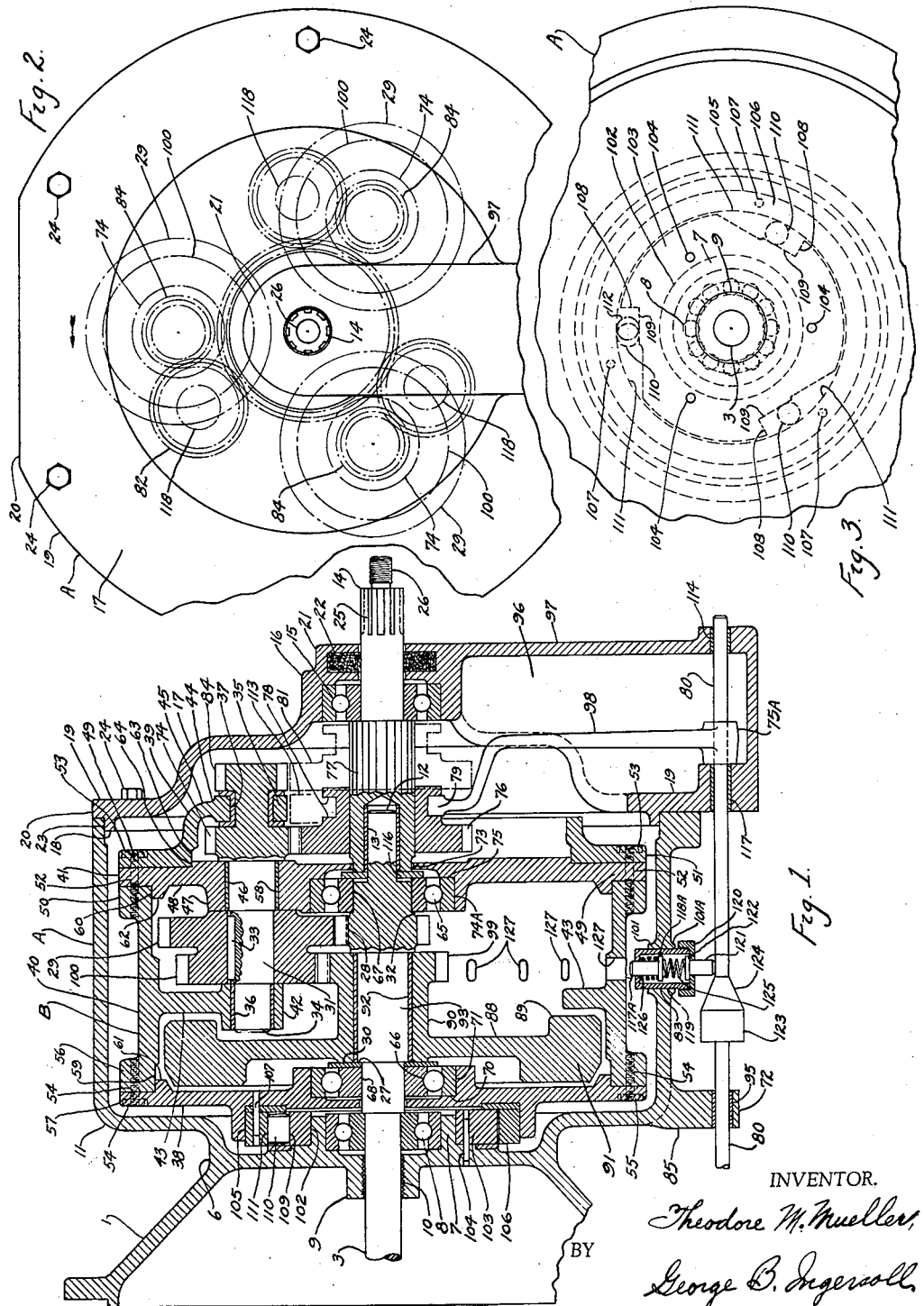
INVENTOR.
Theodore M. Mueller,
BY George B. Ingersoll,
ATTORNEY.

Patented Apr. 24, 1934

1,956,078

UNITED STATES PATENT OFFICE 1,956,078

TRANSMISSION

Theodore M. Mueller, Pontiac, Mich.

Application October 4, 1933, Serial No. 692,090

21 Claims. (Cl. 74—259)

My invention relates to improvements in transmissions in which changes of speeds are accomplished automatically and further relates to improvements in my transmission as disclosed in my application for U. S. Letters Patent, Serial No. 684,346, filed August 9, 1933; and the objects of my improvement are, first, to provide a transmission in which changes of speed are accomplished automatically in accordance with the amount of torque resistance imposed therein, and in which the reactionary forces of the transmission are overcome by a flywheel mechanism adapted to transmit its kinetic energy through a single train of gears to a revolubly mounted mounted housing thereof; second, to afford facilities whereby a flywheel mechanism is adapted to control the driving movement of a revolvably mounted housing in one driving direction in accordance with a decrease of torque imposed thereon, the flywheel mechanism being connected, by torque transmitting means, solely to the torque transmitting means which is used for transmitting the driving torque from a prime mover to a driven assembly such as an axle or similar unit; third, to provide means for locking a transmission against "free wheeling" when the transmission is operating in a reverse direction; and fourth, to provide a reverse gear shifting mechanism operably connected with a mechanism for locking a transmission against "free wheeling".

I attain these objects by the mechanism illustrated in the accompanying drawing, in which—

Figure 1 is a vertical section of the transmission, said transmission being disclosed as being supported on a conventional clutch housing; Fig. 2, a partial end view of the transmission disclosed in Fig. 1, the position of the reverse gear mechanism being indicated therein; and Fig. 3, a partial front end view of the transmission, less the clutch housing, disclosing the one way clutch mechanism thereof.

Similar numerals refer to similar parts throughout the several views.

The transmission assembly A is disclosed as being integrally secured to the clutch housing 1, the clutch housing 1 being utilized to enclose a suitable clutch mechanism (not disclosed) of any desired type for connecting a prime mover to the transmission assembly.

The transmission assembly A is provided with the extension portion 6, which forms a portion of the transmission case 11 and is provided with the boss 7 in which is retained the bearing assembly 8 which revolvably supports the drive shaft 3 at the front end of the transmission assembly A, the extension portion 6 being further provided with the extension portion 9 which may be provided with suitable means, such as the threads 10 for enclosing the drive shaft 3 to prevent the escape of lubricating medium from the transmission assembly A at its forward end.

The drive shaft 3 is supported at its rear end by its stub or extension portion 12 being journalled in the bushing 13 which is suitably mounted in the forward end of the main or driven shaft 14 which is revolvably supported at its rear end in the bearing assembly 15 which is retained in the boss portion 16 of the cover member 17 which closes the open rear end of the transmission case 11, the cover member 17 being provided with the pilot portion 18 which enters and fits within the pilot bore 23 of the transmission case 11, thus providing that the cover member 17 will be mounted in alignment with the transmission case 11. The cover member 17 is secured to the transmission case 11 by the screws 24 extending through the flange 19 to engage portions of the transmission case 11, the upper portion of the flange 19 being cut away as at 20 to provide greater operative clearance space between the transmission assembly A and adjacent portions of the vehicle in which the transmission assembly A may be installed, such as body portions, etc. (not disclosed) which are usually mounted above the transmission and power units of the vehicle. The cover member 17 is further provided with the boss portion 21 in which is retained the packing material 22 which contacts and encloses the main shaft 14 to prevent the escape of lubricating medium from the transmission assembly A at its rear end. The main shaft 14 is provided with the splines 25 and the threaded portion 26 to facilitate attachment to a flange of a propeller shaft when used to transmit torque between the transmission assembly A and a rear axle assembly of a vehicle.

It is to be noted that the drive shaft 3 and the main shaft 14 are thus adapted for relative rotation one to the other with varying or different speeds and are also adapted to rotate in unison at the same speed.

The drive shaft 3 is provided with the gear 28, which may be constructed integrally therewith as disclosed or suitably secured thereto, to form a positive driving connection with the gears 29 which are radially disposed in the transmission assembly A to provide a balanced design and to eliminate any unbalanced centrifugal forces in the transmission inner housing assembly B which is revolvably mounted, as hereinafter disclosed relative to the fixedly mounted transmission case 11. The gears 29 are secured to the shafts 31 by the keys 33, the shafts 31 being provided with the stub or extension portions 34 which are journalled in the bushings 36.

The composite housing of the inner housing assembly B of the transmission assembly A is formed by the end housing member 38 at the front of the inner housing assembly B, the end housing member 39 at the rear of the inner housing assembly B, and the intermediate housing members 40 and 41 which are mounted between said end housing members 38 and 39.

The bushings 36 are suitably mounted in the bosses 42 which are connected with the annular flange or web portions 43 which are connected to the outer wall portion of the intermediate housing 40 and the bushings 37 are suitably mounted in the bosses 44 of the flange or web portions 45 of the end housing member 39, the bushings 37 being retained by the suitably mounted cap members 35, the central or inner portion of the end housing 39, with its bosses 44, being open to extend around and provide operative clearance around the main shaft 14 and its operatively connected mechanism, as hereinafter disclosed, the central or inner portion of the web portion 43 and the bosses 42 being open to extend around and provide operative clearance for gear mechanism hereinafter disclosed.

The shafts 31 are each further provided with the bearing portions 46 which are journalled in the bushings 58 which are suitably secured in the bosses 47 of the web or flange portion 48 which is connected with the flange portion 49 of the intermediate housing 41 which is suitably secured between the flange 51 of the rear end housing 39 and the flange 50 of the intermediate housing 40 and extending through the flange 49 of the intermediate housing 41 to engage the nuts 53.

In a similar manner the front end housing 38 is secured to the intermediate housing 40 by the studs 54 and the nuts 55, the studs 54 being suitably anchored in the flange 56 of the intermediate housing 40 and extending through the flange 57 of the front end housing 38 to engage the nuts 55, the nuts 53 and 55 being suitably recessed in the respective flanges to provide greater operating clearance within the transmission case 11.

The intermediate housing, 40 is provided with the pilot bores 59 and 60 for receiving the pilot portions 61 and 62 respectively of the front and intermediate housings 38 and 41, the rear end housing 39 being provided with the pilot bore 63 for receiving the pilot portion 64 of the intermediate housing 41, the end housings 38 and 39 together with the intermediate housings 40 and 41 thus being accurately secured in alignment in their assembled positions.

It is to be noted that the inner housing assembly B of the transmission assembly A, together with its operatively supported mechanisms, as above and hereinafter to be more fully disclosed, is revolvably mounted upon the bearing assemblies 65 and 66 which are suitably secured, as by being pressed thereon, to the respective portions 67 and 68 of the drive shaft 3, the bearing assembly 65 being longitudinally retained by the shoulder 32 and the thrust washer 116, said thrust washer 116 being operatively mounted between and spacing the inner race of the bearing assembly 65 and the inner end of the main shaft 14, the bearing assembly 65 thus being located adjacent and between the gear 28 and the operatively supporting portions of the shafts 3 and 14, namely the extension portion 12 journalled in the bushing 13, the bearing assembly 66 being longitudinally retained adjacent the shoulder 70 of the bore 71, of the front end housing 38, the bore 71 receiving the outer race of the bearing assembly 66, the bearing assembly 66 being further retained by its inner race operatively contacting the thrust washer 30 which is retained by the shoulder 27 of the drive shaft 3. The web 48 of the intermediate housing 41 is provided with the opening or bore 73 to extend around and provide operating clearance relative to the main shaft 14 and is also provided with the bore 74A and shoulder 75 for receiving and retaining the bearing assembly 65.

The shafts 31 are provided with the gears 74 which operatively engage with the gear 76 which is slidably mounted on the splines 77 of the main shaft 14, the gear 76 being provided with the groove 78 which is engaged by the shift collar 79 of the lever 98 which is suitably provided with the hub 75A and connected to the draft member or shift rod 80 which may be slidably mounted in the bushings 114 and 117 mounted in the cover member 17, said draft member 80 being suitably constructed and connected with manually or power operated means (not shown) whereby the driver of the vehicle, which is equipped with my transmission, can readily shift the gear 76 from its position as disclosed by full lines, Fig. 1 to the position, as disclosed by the dotted lines, at 81, Fig. 1.

It is to be noted that when the gear 76 is thus shifted to the position 81, the gear 76 will operatively engage the reverse idler gears 82 which are revolvably mounted on the stud or shafts 118 which are suitably anchored in portions of the housing member 39, said gears 82 being in constant mesh engagement with the gears 84, and which are respectively connected with the shafts 31, the gear 76 being operatively disconnected from direct engagement or contact with the gears 84 when said gear 76 is in position 81 as indicated by dotted lines, Fig. 1.

It is to be here noted that, I have thus far described a transmission mechanism that will provide a drive through a train of gears or low speed gearing, namely the gear 28, the gears 29, the gears 74 and the gear 76 which thus will transmit driving torque from the drive shaft 3 to the main shaft 14 in one direction, namely a direction corresponding to the forward motion of the vehicle and a clockwise operation of the engine, when viewed from the front of the vehicle, when the gear 76 is in the position as disclosed by full lines in Fig. 1, and in an opposite direction, namely a direction corresponding to the reverse or rearward motion of the vehicle, when the gear 76 is in the position as disclosed by the dotted lines 81, Fig. 1.

The flywheel 89 is provided with the rim or peripheral portion 91 which is connected by the web or flange 88 to the hub 90 which is provided with the bushing 92 which has a bearing on the journal portion 93 of the drive shaft 3.

The flywheel 89 is rotatively mounted on the journal portion 93, of the drive shaft 3, and is provided and connected with the gear 99 which meshes and operates with the gears 100 which may be constructed integrally with the gears 29, said gears 100 and 29 thus being positively connected and driven with the shafts 31 with which the gears 74 and 84 are also positively connected and driven.

It is to be here noted that my transmission herein disclosed comprises the flywheel 89 which is adapted to transmit its kinetic energy to the inner housing assembly B through the single train of gears namely 99 and 100, above disclosed and which constitutes the sole torque transmitting means for the flywheel 89 to transmit its kinetic energy, said sole torque transmitting means being operatively connected with the reduction gear mechanism used for transmitting the driving torque from a prime mover through the drive shaft 3 to the driven shaft 14 and thus to a driven unit such as a rear axle assembly or other similar driven units, this construction thus differing from the mechanism disclosed in my above mentioned patent application, Serial No. 684,346, by the elimination of one of the drive means comprising the internal gear mechanism thereof.

The kinetic energy of the flywheel 89 will thus be transmitted through the gear 99 and the gears 100 to the shafts 31 which in turn will exert a thrust on the bosses 42 and 47 to cause the inner housing assembly B to be driven with a revolving motion in a direction with the rotation of the engine, which in this case is in a clockwise direction, as viewed from the front of a transmission assembly A.

It is to be noted that the inner housing assembly B is restrained from rotation in an opposite direction by the one way clutch transmission hereinafter more fully disclosed. With the inner housing assembly B thus restrained from rotation in a direction opposite to the direction of the engine, it will be readily understood that with the flywheel 89 imposing a thrust on the bearing portions of the bosses 42 and 47, as above described, the inner housing assembly B will be thereby caused to rotatably move in the direction of rotation of the engine or similar driving means as the kinetic energy developed by the flywheel 89 exceeds or overcomes the torque resistance imposed upon the transmission assembly A by the axle or similar unit to be driven.

It is to be noted that the inner housing assembly B which comprises the front end housing 38, the intermediate housings 40 and 41, the rear end housing 39, together with their associated parts, can only revolve in one direction, namely forward or in the direction of the engine drive and never backwards or in a reverse direction.

This is accomplished by the one way operating clutch mechanism, as disclosed in Figs. 1 and 3, and which is operatively connected between the extension portion 6 of the fixed transmission case 11 and the front end housing 38 of the movably mounted inner housing assembly B. The extension portion 6 of the transmission case 11 is provided with the surface 102 on which is mounted the inner member or cam 103 of the one way clutch mechanism, the inner member 103 being positively anchored therein by the suitably anchored pins 104.

The front end housing 38 of the movably mounted inner housing assembly B is provided with the bore 105 in which is mounted the outer member 106 of the one way clutch mechanism, the outer member 106 being positively anchored therein by the pins 107.

The inner member 103 is provided with the notches 108 which are provided with the cam surfaces 109 for engaging the rollers 110 which in turn engage the inner bore or annular surface 111 of the outer member 106, the rollers 110 being located slightly to one side of the center of radial lines extending through the axis of the drive shaft 3, as clearly disclosed in Fig. 3, when said rollers are in their wedged or locked postion, the location of the rollers 110 off of the center line extending through said axis causing the rollers 110 to be immediately wedged between the cam surfaces 109 and the inner bore 111 when the revolvably mounted inner housing assembly F tries to rotate in an anti-clockwise direction, as viewed from the front end of the vehicle or transmission assembly A or in other words, in an opposite direction from the direction of rotation of the engine, thus locking and preventing said inner housing assembly B from said anti-clockwise rotation, relative to the fixed transmission case 11, said movably mounted inner housing assembly B being permitted, by said one way clutch mechanism, to rotate only in a clockwise direction as viewed from the front end of the vehicle, or transmission assembly A, or in other words in the direction of rotation of the engine, said clockwise rotation of said inner housing assembly B being more fully described hereinafter.

In operation when the engine is started, the gear 76 will be in a neutral position between the gears 74 and the gears 84 as indicated by the dotted lines 113, Fig. 1, and as a result of the operation of the one way clutch mechanism, the rollers 110 will move from the position in which the center of the rollers are located off a line extending through the axis of the drive shaft 3 to a position, as indicated at 112, in which the center of the rollers 110 are located approximately on the line extending through the axis of the drive shaft 3, or in a similarly non-engaging or non-wedging position relative to the cam surfaces 109 and the bore 111, which allows the drive shaft 3 to rotate in the direction of rotation of the engine without transmitting any driving torque through said one way clutch mechanism, the gear 99, however, being forced or operated forward in the direction of the rotation of the engine drive, the gear 99 being operatively connected with the flywheel 89. Now it is to be noted that the energy or inertia of the moving flywheel 89, through the operative connection of the flywheel 89, the gear 99, and the gears 29, will move the movably mounted inner housing assembly B in the drive direction of the engine as the torque load imposed by the operatively connected driving parts, of the vehicle, decreases and the more the engine gains in speed, the more the internal housing assembly B, with its operatively connected gear and parts will move in the direction of the engine drive with the result that the whole mass of the inner housing assembly B together with its operatively connected gears and parts will revolve with the drive shaft 3 and at the same speed, and when the drive shaft 3 and the internal housing assembly B and its operatively connected gears and parts have attained to the same speed, the gears operatively connected with the internal housing assembly B will be stationary relative to the said internal housing assembly B.

Now, if the gear 76 is shifted in either a forward or reverse position, as hereinbefore described, the main clutch of the vehicle, operatively connecting the engine assembly with the drive shaft 3, will be operatively controlled to assume an engaged position in which torque is transmitted from the engine assembly to the drive shaft 3, and this will cause the rotation of the inner housing assembly B to slow down, the rotation of said inner housing assembly B and its operatively connected gears and parts decreasing its speed of rotation to the point when the vehicle begins to move, and if the torque load imposed on the transmission by the operation of driving the vehicle requires a full slow speed, the inner housing assembly B and its associated parts will be brought to a standstill. However, just as soon as the above mentioned torque load imposed on the transmission assembly by the driving operation of the vehicle decreases in any amount, the engine assembly will immediately increase its speed of operation accordingly and the added or increased momentum acquired by the flywheel 89 will again move the inner housing assembly B and its operatively associated parts in the forward direction of movement. In other words, with my transmission, there is always the tendency to run in high speed.

To further provide a balanced design to eliminate any unbalanced centrifugal forces, the gears 84 as well as the shafts 31 with their operatively associated gears will be located in radially disposed positions relative to the axis of the drive shaft 3; also whereas I have disclosed three groups of said gears and shafts radially disposed, any number of groups of gears and shafts may be used when desired, the object being to always have all parts or members so located and balanced so that no unbalanced forces are set up at any time in the transmission assembly when the revolvably mounted portions thereof are operating.

The rim portion 91 of the flywheel member 89 may be constructed of the desired size or mass and so located outwardly from the axis of the drive shaft 3 to enable the flywheel member 89 to develop the required inertia forces or energy in operation to control the movement of the internal housing assembly B and its associated parts by its inertia or momentum forces in accordance with the amount of torque reaction imposed thereon in the transmission of the driving forces to the vehicle driving mechanism.

Thus the size and energy of the flywheel mechanism will necessarily have to be developed in accordance with each installation of my transmission in a vehicle and it will undoubtedly be found in many instances that the rim portion 91 may be greatly decreased. Also it is to be noted that the use of the flywheel 89 together with its operatively associated parts rotating therewith to form a flywheel mass will permit the usual or conventional flywheel of the engine to be greatly decreased in weight and size, thus accomplishing an initial saving in the manufacture of an important part of an engine assembly in a vehicle equipped with my transmission, the flywheel 89 tending to always add its flywheel inertia effect to that of the conventional flywheel of the engine assembly.

In operation, the movement or motions of the inner housing assembly B together with its associated gears and parts will always be in the forward or driving direction.

Also the inner housing assembly B will stand still during low speed operation only, during which operation the inner operatively connected gears will move in the forward or driving direction.

With the inner housing assembly B locked or restrained by the one way clutch mechanism from backward movement and with the inertia energy of the relatively great mass of the housing members and flywheel mechanism together with their associated and operatively connected parts, the tendency of the mechanism to move in the forward or driving direction will always be fast and sensitively responsive to a change in the torque reactions opposing the driving operation of the transmission.

The torque reactions imposed by the load to be driven or moved, as by the operation of the vehicle or similar operating means, will be overcome by the kinetic energy of the flywheel 89 together with its operatively connected gear, said flywheel and gear developing energy to run ahead of said torque reactions.

The necessary speeds of operation of the transmission in the vehicle will be automatically and continuously attained, without the usual and conventional shift steps therebetween, and with smooth changes of driving speed which are resultant from and in accordance at all times with the torque load reactions imposed by the driving torque load reactions imposed by the driving torque of the driving axle assembly or similar driven unit of a vehicle or similar mechanism operatively equipped with my transmission mechanism, and the driving ratios of the transmission, when the inner housing assembly B is revolving, being the result of the relative difference or differential movement between the rotating inner housing assembly B and the gear mechanism operatively driving same as above described.

When said torque reactions permit, as under driving conditions which require a slow speed, the inner housing assembly B will be brought to a standstill, as above set out, then as said torque reactions decrease due to a decreae in the driving load, the engine will speed up and the added momentum of the flywheel mechanism will cause the inner housing assembly B and its operatively connected driving mechanism to revolve with the above mentioned differential movement relative to the main shaft 14, and then as said torque reactions further decrease and the speed of the engine further increases, the speed of the inner housing assembly B will further increase in the direction of the engine drive until the total revolving mass of internal housing assembly B and its operatively connected gear mechanism will revolve with and at the same speed of the drive shaft 3 together with the main shaft 14 and in which case the gears operatively mounted within the internal housing assembly B will be stationary relative to said internal housing assembly B.

When the transmission starts to operate, the gear reduction of the driving mechanism is immediately available if the torque reactions imposed are sufficient and as the vehicle begins to operate and as the torque reactions decrease, the flywheel energy increases and exceeds the torque reactions thus resulting in the automatic and smooth variations of driving speeds without the inconvenience of the conventional steps, as present in the present types of transmission devices, and eliminating the necessity of gear shifting means for changing the speeds, all of the gear members of the transmission being constantly in mesh with their respective operating gear members.

The cover member 17 is provided with the boss portion 97 which provides the chamber 96 in which the gear shifting lever 98 operates.

The draft member or shaft 80 is supported in and has a bearing in the bushings 114 and 117 which are suitably supported in bosses carried between the walls of the cover member 17. The draft member 80 may be further suitably supported in the bushing 95 which is mounted in the boss 72 of the bracket 85 which may be suitably connected and supported from the transmission case 1 or by means suitably and separately supported relative to the transmission case 11 as desired. The housing or cage member 83 may be suitably mounted and located in the wall of the transmission case 11 by being pressed therein, or any similar suitable means may be used for locking same, the transmission case 11 being suitably provided with the bosses 101 and 101A to provide a suitable bearing for supporting the housing member 83.

The plunger 117A is slidably mounted in the end wall of the housing member 83 and is provided with the head or shoulder portion 118A which may be of sufficient size as to slidably support and guide the plunger 117A as it moves in the bore 119 of the housing member 83.

The housing member 83 is provided with an outer end which is closed by the cap member 120 which may be suitably connected to the housing member 83 as by threading or similar suitable means, and in which is slidably mounted the plunger 121, the plunger 121 being provided with the head or shoulder portion 122 which may be of sufficient size to slidably support and guide the plunger 121 in its movement in the chamber 119 of the housing member 83. The draft member or shaft 80 is provided with the collar 123 which may be provided with the inclined, tapered or conical surface 124 which is adapted to contact the plunger 121 and slidably move it axially along the bore 119 of the housing member 83. The spring 125 is mounted between the head portion 122 of the plunger 121 and the head portion 118A of the plunger 117A and tends to maintain the head portion 122 of the plunger 121 against the inner surface of the cap member 120 and at the same time exerts a thrust against the plunger 117A. The spring 126 is mounted between the head portion 118A of the plunger 117A and the inner end surface of the housing member 83 and is of sufficient size to exert a heavier thrust than the thrust exerted by the spring 125, thus the spring 126 maintains the plunger 117A out of engagement with the intermediate housing 40 and maintains the plunger 121 in contact with the draft or shaft member 80. The intermediate housing 40 is provided with a series of holes 127 or similar lock engaging surfaces in its outer wall, the holes 127 being radially disposed around the intermediate housing 40 in alignment with and adapted to be engaged by the plunger 117A. As the draft or shaft member 80 is slidably operated to move the lever 98 to slide the gear 76, from its position of engagement with the gears 74, to the position indicated by the dotted lines 81 in which position the gear 76 will mesh with the gears 82, as herein above disclosed, to accomplish a reverse operating movement of the shaft 14, the conical portion 124 of the draft member 80 will force the plunger 121 inwardly thus compressing the spring 125 sufficiently to overcome the thrust of the spring 126 and thus forcing the plunger 117A into one of the holes 127 which will lock the intermediate housing 40 against rotative movement, thus preventing the inner housing assembly B from operating with "free wheeling" characteristics when the transmission is operated through its reverse mechanism to drive the vehicle, or similar unit, in a reverse direction.

It is to be noted that with the series of holes 127 arranged radially in alignment with the plunger 117A that as soon as the gear 76 is moved to its reverse operating position, the plunger 117A will move inwardly toward the intermediate housing 40 and if it does not register immediately with one of the indexing holes 127 the thrust of the spring 125 will cause the plunger 117A to immediately move into an engagement with one of the holes 127 as soon as the intermediate housing 40 rotates to such a position where one of the holes 127 is in alignment with the plunger 117A.

It will thus be seen that my transmission will be provided with suitable locking mechanism which will automatically lock my transmission against "free wheeling" operation during the reverse operation of the transmission to conform with the legislation of laws of any localities, states or countries that require such locking mechanism to be applied to transmissions.

It is to be understood that whereas I have disclosed my transmission as being especially applicable to operation in vehicles and similar units, I do not limit the use of my invention to such installations as it is readily adapted to any and various mechanisms in which a transmission is required and in which driving torque is transmitted.

It is to be understood that my transmission, as disclosed by this present patent application, will operate to accomplish many of the operations as disclosed by the transmission in the above mentioned patent application, Serial No. 684,346, but with a much lesser number of mechanical parts, thus resulting in a more efficient, simple, light weight, and economical transmission mechanism.

I claim:

1. In a transmission for a vehicle provided with driving mechanism, the combination of a drive shaft suitably mounted, a main driven shaft suitably mounted, a housing suitably mounted and adapted to revolve about said drive and said main driven shafts, gear members revolvably supported by and relative to said housing and adapted to revolve with said housing about said drive and said driven shafts, said gear members being operatively connected with said drive shaft and said main driven shaft, said gear members constituting the sole driving means between said drive shaft and said housing, a second housing fixedly mounted and enclosing said first mentioned housing, a clutch mechanism operatively connected with said first mentioned housing and said second housing, said clutch mechanism restraining said first mentioned housing from revolving in one direction, and a flywheel mechanism suitably mounted and comprising a single driving gear operatively connected with said first mentioned gear members, said single driving gear of said flywheel mechanism and said gear members constituting the sole driving means between said flywheel mechanism and said first mentioned housing, said flywheel mechanism being actuated by torque reactions imposed on said main driven shaft by the driving mechanism of the vehicle to cause said first mentioned housing to revolve in the driving direction of said drive shaft.

2. In a transmission, the combination of a drive shaft suitably mounted, a driven shaft suitably mounted, a carrier member rotatably supported by said drive and said driven shafts, a countershaft provided with gears, said counter shaft being rotatably supported by said carrier member and operatively connected with said drive and said driven shafts, and flywheel means responsive to torque reactions imposed on said driven shaft and adapted to actuate said countershaft and said carrier member to move about said drive and said driven shafts to provide varying speeds of said driven shaft, said flywheel means comprising a sole gear member mounted thereon, said sole gear member of said flywheel means operatively connecting said flywheel means with only one of the gears of said countershaft and with said carrier member to transmit the kinetic energy of said flywheel means to said countershaft and its carrier member.

3. In a transmission, the combination of a housing revolvably mounted relative to an axis, a driven shaft suitably mounted and provided with a gear thereon, a drive shaft suitably mounted, a pair of gear members revolvably supported by said housing, said pair of gear members being operatively connected with said driven and said drive shafts, said pair of gear members being adapted to permit free wheeling operation of said driven shaft relative to said drive shaft, and means for engaging said housing to lock said housing against revolving to prevent free wheeling operation of said driven shaft relative to said drive shaft.

4. In a transmission, the combination of a drive shaft, suitably mounted, a driven shaft suitably mounted, means comprising gear members and operatively connecting said drive and said driven shafts, said means being supported independent of said drive shaft, and flywheel means having a single gear member supported thereon, said single gear member being operatively connected with said first mentioned means to automatically permit said drive shaft to operate said driven shaft at varying speeds, the gear members of said first mentioned means being operatively connected to always revolve at equal speeds.

5. In a transmission, the combination of a drive shaft suitably mounted and provided with a gear fixedly supported thereon relative to said drive shaft, a driven shaft suitably mounted and provided with a gear mounted thereon, a housing rotatably mounted, clutch means suitably mounted and operatively connected with said housing to restrain it from rotating in one direction, a countershaft comprising gear members and solely supported by said housing and operatively connecting the gear fixedly supported on said drive shaft and said gear on said driven shaft, said countershaft provided with gear members constituting the sole means for operatively connecting said drive and said driven shafts together with said gears mounted thereon to drive said housing, and flywheel means rotatively mounted on said drive shaft, said flywheel means being provided with a sole gear member supported thereon, said sole gear member being operatively connected with said countershaft provided with gear members operatively connecting said gears mounted on said drive and said driven shafts, said flywheel means being responsive to torque reactions imposed on said driven shaft to drive said housing solely through said countershaft provided with gear members operatively connecting said gears of said drive and said driven shafts to rotate in the driving direction of said drive shaft with speeds varying with the intensity of said torque reactions.

6. In a transmission, the combination of a drive shaft suitably mounted, a driven shaft suitably mounted, a housing rotatably mounted and provided with a series of indexing portions, means for restraining said housing from rotating in one direction, a gear mechanism operatively connecting said drive and said driven shafts, said gear mechanism being operatively connected with said housing, a flywheel member operatively connected with said gear mechanism, a gear slidably mounted on said driven shaft and adapted to engage and disengage said gear mechanism, a transmission case fixedly supported relative to said housing, a member movably supported in said transmission case and adapted to engage the index portions of said housing to lock said housing against rotation, a lever member for shifting said gear slidably mounted on said driven shaft, and means for moving said lever member, said means being operatively connected with said member movably mounted in said transmission case to operate said member to engagement with the index portions of said housing rotatably mounted.

7. In a transmission, the combination of a drive shaft suitably mounted, a driven shaft suitably mounted, a housing rotatably mounted and restrained from rotation in one direction, a gear mechanism suitably mounted to provide a driving connection between said drive and said driven shafts, said gear mechanism further providing a driving connection between said main and said driven shafts and said housing, a flywheel mechanism suitably mounted and operatively connected with said gear mechanism, a reverse gear mechanism suitably mounted and engaging said first mentioned gear mechanism, means for shifting said reverse gear mechanism, and means for locking said housing against rotation, said last mentioned means being operatively connected with said first mentioned means.

8. In a transmission, the combination of a fixed transmission case, a housing revolvably mounted in said transmission case, a drive shaft suitably mounted, a driven shaft suitably mounted, a gear mechanism operatively connecting said drive and said driven shafts together with said housing revolvably mounted, said gear mechanism being solely supported by said housing, said gear mechanism being thereby enabled to revolve about the axis of said drive shaft with varying rates of revolutions relative to the revolutions of said drive shaft, said gear mechanism being adapted to provide free wheeling characteristics between said driven and said drive shafts, and means suitably mounted in said transmission case to engage and lock said revolvably mounted housing against rotation to prevent said gear mechanism from operating with free wheeling characteristics.

9. In a transmission, the combination of a revolvably mounted housing, a gear mechanism suitably mounted in said housing and comprising a countershaft having its axis extending parallel with the axis of said revolvably mounted housing, said gear mechanism further comprising a reverse gear fixedly mounted on said countershaft and adapted to revolve therewith, means for engaging and locking said revolvably mounted housing against rotation, a gear member slidably mounted and adapted to engage said reverse gear to control the operation of said reverse gear, and means for controlling the sliding movement of said gear member, said last mentioned means operatively controlling the operation of said first mentioned means.

10. In a transmission, the combination of a revolvably mounted gear mechanism comprising a housing adapted to revolve therewith, said gear mechanism further comprising a slidably mounted gear, shifter means operatively engaging said slidably mounted gear of said revolvably mounted gear mechanism, and movably mounted means suitably anchored and adapted to engage said housing to prevent rotation thereof, said movably mounted means being actuated by said shifter means to engage said housing.

11. In a transmission, the combination of a drive gear, a driven gear, a plurality of countershafts each provided with a pair of gears operatively connecting said drive and said driven gears, a revolvably mounted housing supporting said plurality of countershafts and adapted to revolve therewith, said revolvably mounted housing together with said plurality of countershafts providing the transmission with free wheeling characteristics, and means suitably anchored and adapted to engage said housing to prevent rotation thereof and to thus further eliminate the free wheeling characteristics of the transmission.

12. In a transmission, the combination of a driven gear, a driving gear, a gear mechanism operatively connecting said drive and said driven gears and suitably mounted to revolve around said drive and said driven gears, and a revolubly mounted housing adapted to revolve with said gear mechanism around said drive and said driven shafts, said revolvably mounted housing and said gear mechanism providing free wheeling characteristics, means suitably anchored and adapted to engage said housing to prevent rotation thereof, said means comprising a pair of resiliently actuated plungers, and a draft member suitably mounted and operatively connected with one of said plungers to actuate the other of said plungers to engage and lock said housing, said means thereby elminating the free wheeling characteristics of the transmission.

13. In a transmission, the combination of a driven gear, a driving gear, a gear mechanism operatively connecting said drive and said driven gears and suitably mounted to revolve around said drive and said driven gears, and a revolubly mounted housing adapted to revolve with said gear mechanism around said drive and said driven shafts, said revolvably mounted housing and said gear mechanism providing free wheeling characteristics, a plunger suitably anchored and adapted to engage and lock said housing against rotation, the locking of said housing eliminating said free wheeling characteristics, a resilient member suitably mounted to maintain said plunger in a disengaged position relative to said housing, a second plunger slidably mounted, a second resilient member interposed between said first and said second plungers, and draft means suitably mounted and adapted to actuate said second mentioned plunger to actuate said first mentioned plunger to engagement with said housing.

14. In a transmission, the combination of a drive gear, a driven gear, a gear mechanism operatively connecting said drive and said driven gears and suitably mounted to revolve around said drive and said driven gears, and a revolvably mounted housing adapted to revolve with said gear mechanism around said drive and said driven gears, said revolvably mounted housing and said gear mechanism providing free wheeling operation, means movably mounted and adapted to lock said housing against rotation to prevent said free wheeling operation, and a draft member suitably mounted and extending substantially at right angles with said means, said draft member being provided with an inclined surface for engaging and actuating said means.

15. In a transmission, the combination of a countershaft revolvably mounted and provided with gears fixedly supported thereon and adapted to revolve therewith around the axis of the transmission, a shaft member suitably mounted and subjected to torque reactions, said shaft member being provided with a drive gear, said drive gear of said shaft member being operatively connected with one of said gears of said revolvably mounted countershaft, and a flywheel member suitably mounted and provided with a sole gear member, said sole gear member of said flywheel member being operatively connected with one of said gears fixedly supported on said countershaft, said flywheel member being movably responsive to variations in the intensity of the reactions to which said shaft member is subjected, said flywheel member causing said countershaft together with said gears fixedly supported thereon to revolve with varying speeds about said shaft member in accordance with the intensity of said torque reactions to provide varying driving speeds of said shaft member.

16. In a transmission, the combination of a drive gear suitably mounted, a driven gear suitably mounted, a countershaft revolvably supported independently of said drive shaft and provided with three gears fixedly supported thereon to revolve therewith, two of said gears of said countershaft operatively connecting said drive and said driven gears, means for supporting said countershaft, and a flywheel mechanism movably responsive to variations in torque reactions imposed on said driven gear and provided with a gear operatively connected with said third gear of said countershaft, said gear of said flywheel mechanism constituting the sole means to enable said flywheel mechanism to cause said countershaft together with said means supporting said countershaft to revolve about said drive and said driven gears with varying speeds in accordance with the intensity of torque reactions imposed on said driven gear.

17. In a transmission, the combination of a drive gear suitably mounted, a driven shaft revolvably mounted, a driven gear suitably mounted on said driven shaft to move longitudinally thereof, said driven gear being suitably secured to revolve with said driven shaft, a countershaft revolvably supported independently of said drive shaft and provided with four gears fixedly supported thereon to revolve therewith, two of said gears of said countershaft operatively connecting said drive gear and said driven gears, means for supporting said countershaft, a flywheel mechanism movably responsive to variations in torque reactions imposed on said driven shaft, said flywheel mechanism being provided with a gear operatively connected with a third gear of said countershaft, said gear of said flywheel mechanism constituting the sole means to enable said flywheel mechanism to cause said countershaft together with said means supporting said countershaft to revolve about said drive and said driven gears with varying speeds in accordance with the intensity of torque reactions imposed on said driven shaft, a reverse gear suitably mounted and operatively connected with said fourth gear of said countershaft, and means for moving said driven gear to engage said reverse gear.

18. In a transmission, the combination of a housing rotatably mounted and provided with annular flanges having openings in their central portions, countershafts rotatably mounted in the annular flanges of said housing and each provided with a plurality of gears, said plurality of gears comprising a pair of gears located on opposite sides of one of said annular flanges of said housing, a drive shaft provided with a sole drive gear fixedly mounted thereon and meshing with one of the plurality of gears of said countershafts, a driven shaft, a gear slidably mounted on said driven shaft, reverse gears rotatably mounted in said housing and meshing with one of the pairs of gears located on opposite sides of one of the annular flanges of said housing, means for shifting said gear slidably mounted on said driven shaft through the opening in the central portion of one of the annular flanges of said housing to alternately engage one of said pairs of gears, located on opposite sides of one of said annular flanges, together with said reverse gears to change the direction of rotation of said driven shaft, a flywheel member suitably mounted and operatively connected with one of the plurality of gears of said countershafts, said flywheel member being movably responsive to torque reactions imposed on said driven shaft, a fixed housing, and clutch means operatively connecting said first mentioned housing with said fixed housing, said clutch means restraining said first mentioned housing from rotating except in one direction.

19. In a transmission, the combination of a housing rotatably mounted and provided with a series of indexing openings in its wall portions, a drive shaft suitably mounted, a driven shaft suitably mounted, a gear mechanism operatively connecting said drive and said driven shafts together with said housing, a flywheel member suitably mounted and operatively connected with said gear mechanism, said flywheel member being movably responsive to torque reactions imposed on said driven shaft and adapted to actuate said housing and said gear mechanism to revolve around the axis of said drive and said driven shafts, means for restraining said housing from rotating in one direction, and means suitably mounted and adapted to engage the indexing openings in the wall portions of said housing to lock said housing against rotation.

20. In a transmission, the combination of a housing rotatably mounted and provided with a series of openings in its wall portions, a gear mechanism suitably mounted and operatively connected with said housing, a flywheel member suitably mounted and operatively connected with said gear mechanism to rotate said housing, means for restraining said housing from rotating in one direction, and means suitably mounted and adapted to engage the openings in the wall portions of said housing to lock said housing against rotation.

21. In a transmission, the combination of a housing rotatably mounted, a gear mechanism suitably mounted and operatively connected with said housing, a flywheel member suitably mounted and operatively connected with said gear mechanism to rotate said housing, means for restraining said housing from rotating in one direction, and a plunger suitably mounted and extending longitudinally in a plane located substantially at right angles with the axis of said housing, said plunger being fixed against rotation with said housing, said plunger being adapted to engage said housing to lock said housing against rotation.

THEODORE M. MUELLER.